(12) United States Patent
Waters et al.

(10) Patent No.: US 11,144,977 B2
(45) Date of Patent: *Oct. 12, 2021

(54) SYSTEMS AND METHODS FOR PERSONALIZING DIGITAL FANTASY SPORTS MEMORABILIA

(71) Applicant: Autography LLC, St. Petersburg, FL (US)

(72) Inventors: Thomas J. Waters, St. Petersburg, FL (US); Robert N. Barrett, St. Petersburg, FL (US)

(73) Assignee: Autography LLC, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,301

(22) Filed: Sep. 24, 2018

(65) Prior Publication Data
US 2019/0026811 A1 Jan. 24, 2019

Related U.S. Application Data

(63) Continuation of application No. 14/812,356, filed on Jul. 29, 2015, now Pat. No. 10,083,470.
(Continued)

(51) Int. Cl.
*G06Q 30/00* (2012.01)
*G06Q 30/06* (2012.01)
(Continued)

(52) U.S. Cl.
CPC ......... *G06Q 30/0621* (2013.01); *A63B 71/06* (2013.01); *G06K 9/00161* (2013.01);
(Continued)

(58) Field of Classification Search
CPC ............. G06Q 30/0621; G06Q 30/018; G06Q 30/0185; G06Q 50/01; G06K 9/00899;
(Continued)

(56) References Cited

U.S. PATENT DOCUMENTS 7,143,290 B1 11/2006 Ginter et al.
9,141,959 B2 9/2015 Auld et al.
(Continued)

OTHER PUBLICATIONS

Mueller, Rich, "Topps Launches BUNT App for Android", Jun. 4, 2014, Sports Collectors Daily, https://www.sportscollectorsdaily.com/topps-launches-bunt-2014-app-android/ (Year: 2014).*
(Continued)

*Primary Examiner* — Anand Loharikar
(74) *Attorney, Agent, or Firm* — Shumaker, Loop & Kendrick, LLP

(57) ABSTRACT

Disclosed are methods and systems for generating digital fantasy sports memorabilia including: providing a digital fantasy sports memorabilia signor with a digital fantasy sports photograph, a digital fantasy sports jersey, or a combination thereof; receiving at least one of an electronic signature or an electronic written message from the fantasy sports digital memorabilia signor to be embedded in the digital fantasy sports photograph, the digital fantasy sports jersey, or the combination thereof; embedding the at least one of an electronic signature or an electronic written message from the digital fantasy sports memorabilia signor into the digital fantasy sports photograph, the digital fantasy sports jersey, or a combination thereof to form the generated digital fantasy sports memorabilia; sending the generated digital fantasy sports memorabilia including the electronic signature and the electronic written message to a verification service to verify authenticity of the electronic signature and electronic written message in the generated digital fantasy sports memorabilia; and delivering the generated fantasy sports memorabilia to a digital fantasy sports receiver.

18 Claims, 5 Drawing Sheets

Related U.S. Application Data

(60) Provisional application No. 62/092,624, filed on Dec. 16, 2014.

(51) Int. Cl.
| | | |
|---|---|---|
| *G06K 9/00* | (2006.01) | |
| *A63B 71/06* | (2006.01) | |
| *H04L 9/32* | (2006.01) | |
| *G10L 17/00* | (2013.01) | |
| *G06Q 50/00* | (2012.01) | |

(52) U.S. Cl.
CPC ..... *G06K 9/00281* (2013.01); *G06K 9/00288* (2013.01); *G06K 9/00416* (2013.01); *G06K 9/00744* (2013.01); *G06K 9/00892* (2013.01); *G06K 9/00899* (2013.01); *G06Q 30/018* (2013.01); *G06Q 30/0185* (2013.01); *G10L 17/00* (2013.01); *H04L 9/3231* (2013.01); *H04L 9/3247* (2013.01); *G06Q 50/01* (2013.01)

(58) Field of Classification Search
CPC ........... G06K 9/00161; G06K 9/00288; G06K 9/00744; G06K 9/00416; G06K 9/00281; G06K 9/00892; A63B 71/06; H04L 9/3247; H04L 9/3231; G10L 17/00
USPC ................................................ 705/26.1–27.2
See application file for complete search history.

(56) References Cited

U.S. PATENT DOCUMENTS

| | | | |
|---|---|---|---|
| 9,558,416 B2 | 1/2017 | Waters et al. | |
| 9,818,123 B2 | 11/2017 | Waters et al. | |
| 2003/0135740 A1 | 7/2003 | Talmor et al. | |
| 2004/0007870 A1* | 1/2004 | Ueno | G09F 1/00 283/72 |
| 2005/0125337 A1 | 6/2005 | Tidwell et al. | |
| 2005/0257045 A1 | 11/2005 | Bushman et al. | |
| 2009/0025090 A1 | 1/2009 | Clement et al. | |
| 2010/0289940 A1 | 11/2010 | Toguchi | |
| 2011/0107433 A1 | 5/2011 | Steelberg et al. | |
| 2011/0208655 A1 | 8/2011 | Steelberg et al. | |
| 2013/0106981 A1 | 5/2013 | Tsai et al. | |
| 2013/0117665 A1 | 5/2013 | Tagliaferri et al. | |
| 2013/0132230 A1* | 5/2013 | Gibson | H04L 67/22 705/26.8 |
| 2013/0138967 A1 | 5/2013 | Auld et al. | |
| 2014/0032371 A1 | 1/2014 | Traina et al. | |
| 2018/0060879 A1 | 3/2018 | Waters et al. | |

OTHER PUBLICATIONS

European Search Report for corresponding European Patent Application No. 15200199.6, dated Apr. 26, 2016 (10 pages).

\* cited by examiner

SYSTEMS AND METHODS FOR PERSONALIZING DIGITAL FANTASY SPORTS MEMORABILIA

CROSS-REFERENCE TO RELATED APPLICATION

This application is a Continuation application claiming priority from U.S. patent application Ser. No. 14/812,356 filed on Jul. 29, 2015, which claims priority from U.S. Provisional Patent Application No. 62/092,624 filed on Dec. 16, 2014, the contents of which are incorporated by reference herein for their entirety.

TECHNICAL FIELD

The present invention relates generally to the field of digital memorabilia, and more particularly, to systems and methods for personalizing digital fantasy sports memorabilia.

BACKGROUND

Over the past two decades, digital venues, digital activities, and digital memorabilia have grown at an exponential rate, directly coinciding with the advent and ever increasing popularity of the internet. Before the advent of the internet, these digital venues and digital activities did not exist. For example, fantasy sports teams and leagues did not exist before the digital age. However, fantasy sports teams and leagues have gained immense popularity, as evidenced by the Fantasy Sports Trade Association's (FSTA) staggering statistic that 42 million people aged 12 and older played fantasy sports in the U.S. and Canada in 2014.

Fantasy sports are games where participants act as sports team owners who assemble virtual teams of players from the real world rosters of actual teams. These virtual teams "compete" against other's virtual teams using game statistics generated by real individuals (or teams) in professional or collegiate sports. Fans can cut or trade players depending on the rules of their individual leagues, and points are compiled during actual game play manually by a designated league commissioner or (increasingly) by a computer software application.

As the popularity of these fantasy sports teams and leagues has grown, professional athletes have become ever more aware of its immense popularity, and to date, professional athletes frequently directly participate in these leagues.

Although athletes can autograph various forms of physical memorabilia for remuneration, to date, there has never been a way to do the same digitally for fantasy sports applications, leagues, and teams.

BRIEF SUMMARY

Therefore, a need exists to provide methods and systems for autographing digital fantasy sports memorabilia and authenticating such autographs. The advantages of such methods and systems include, but are not limited to, further monetizing one untapped revenue stream while further providing a service for fans that is not currently being met. By authenticating autographed digital fantasy sports memorabilia, the ever-present danger of fraud can be avoided or highly reduced thereby providing further encouragement and assurance of the authenticity of this digital fantasy sports memorabilia and the use of the disclosed methods and systems. The disclosed methods and systems for incorporating personalized digital media into fantasy sports memorabilia includes, for example, player's images in fantasy sport software applications that can be personalized by the players for fans and shared across a range of actual and fantasy platforms. Additionally, athletes can participate in these platforms and provide fans with incentives and rewards for participating in these methods and systems.

Athletes can autograph and personalize digital memorabilia (photographs, video, voice messages, etc.) for fans at sporting events or other live appearances. This personalized digital memorabilia can be shared on fantasy sports platforms and can be further customized with the virtual team's logos on the player's uniform, jersey, helmet, or hat if desired. Depending on the arrangements with individual sports, leagues, teams, and hosting organizations, real and fantasy player's personalized memorabilia can be featured on television broadcasts, streaming media online, or posted to any number of social media platforms such as YouTube, Facebook, Instagram, or Pinterest, thus providing additional revenue streams from the disclosed methods and systems.

Disclosed are methods for generating digital fantasy sports memorabilia, the method includes: (a) providing a digital fantasy sports memorabilia signor with a digital photograph (e.g., of the signor's actual team), a digital fantasy sports photograph, a digital fantasy sports jersey, or a combination thereof; (b) receiving an electronic signature, an electronic written message, or a combination thereof from the fantasy sports digital memorabilia signor to be embedded in the digital photograph (e.g., of the signor's actual team), the digital fantasy sports photograph, the digital fantasy sports jersey, or a combination thereof; (c) optionally receiving a voice message, video message, or a combination thereof from the digital fantasy sports memorabilia signor to also be embedded in the digital photograph (e.g., of the signor's actual team), the digital fantasy sports photograph, the digital fantasy sports jersey, or the combination thereof; (d) embedding the electronic signature, the electronic written message, or a combination thereof from the digital fantasy sports memorabilia signor into the digital photograph (e.g., of the signor's actual team), the digital fantasy sports photograph, the digital fantasy sports jersey, or a combination thereof to form the generated digital fantasy sports memorabilia; wherein the generated digital fantasy sports memorabilia optionally includes the voice message, video message, or a combination thereof in the digital fantasy sports photograph; (e) sending the generated digital fantasy sports memorabilia including the electronic signature, the electronic written message, or a combination thereof to a verification service to verify authenticity of the electronic signature and electronic written message in the generated digital fantasy sports memorabilia; and (f) after verifying authenticity of the electronic signature, the written message, or a combination thereof in the generated digital fantasy sports memorabilia, delivering the generated digital fantasy sports memorabilia to a digital fantasy sports memorabilia receiver in real time, or (g) storing the generated digital memorabilia for delivery to the digital fantasy sports memorabilia receiver upon request. In certain aspects, at least one of step (a), step (b), step (c), step (d), step (e), step (f), step (g), or any combination thereof is performed in real-time.

In certain aspects, verification includes verifying authenticity of the electronic signature or electronic written message of the generated digital fantasy sports memorabilia by generating a scoring number associated with a digital fantasy sports memorabilia signor identification verification in which the electronic signature and the electronic written message must achieve at least a 90% confidence level based on an X,Y array coordinates including a statistical comparison of velocity between coordinates and relative position of points between coordinates and the voice message, video message, or a combination thereof, if present, must achieve at least a 90% confidence level based on amplitude and frequency and/or facial recognition when compared to reference samples of the digital fantasy sports memorabilia signor.

In certain aspects, the electronic signature or the electronic written message must achieve at least a 95% confidence level based on an X,Y array coordinates including a statistical comparison of velocity between coordinates and relative position of points between coordinates and the voice message, video message, or a combination thereof, if present, must achieve at least a 95% confidence level based on amplitude and frequency and/or facial recognition when compared to reference samples of the digital fantasy sports memorabilia signor. In certain aspects, the voice message, video message, or a combination thereof is present.

In certain aspects, the electronic signature and the electronic written message must achieve at least a 99% confidence level based on an X,Y array coordinates including a statistical comparison of velocity between coordinates and relative position of points between coordinates and the voice message, video message, or a combination thereof is present in the generated digital fantasy sports memorabilia and must achieve at least a 99% confidence level based on amplitude and frequency and/or facial recognition when compared to reference samples of the digital fantasy sports memorabilia signor. In certain aspects, verification including but not limited to verifying the electronic signature, electronic written message, or a combination thereof includes comparing the signor's signature to references in a look-up table and verifying authenticity on Bayesian statistical analysis. In certain aspects, this look-up table is updated, preferably in real time, upon each successful authentication of the signor. This verification feature advantageously recognizes the potential change in a signor's signature over time and advantageously avoids false positive, false negatives, or a combination thereof during the authentication process. Facial recognition disclosed herein also includes the above mentioned authentication features (e.g., based on Bayesian statistical analysis) and may be updated in real time to account for facial feature changes over a given time period while simultaneously avoiding false positives, false negatives, or a combination thereof.

In certain aspects, the method further includes monitoring at least one of an electronic signature, a voice message, or an electronic written message by a monitoring agent.

In certain aspects, the method further includes determining whether the generated digital fantasy sports memorabilia with the voice message and the electronic signature or electronic written message is delivered to the digital memorabilia receiver based at least in part on the monitoring agent.

In certain aspects, the method further includes generating a certificate of authenticity for the generated digital memorabilia including the percentage of confidence of authenticity.

In certain aspects, the method further includes delivering the certificate of authenticity to the digital fantasy sports memorabilia receiver (i.e., digital fantasy sports fan/participant). In certain aspects, the generated digital memorabilia may be archived and verified and/or authenticated at a later date before delivering the memorabilia to the receiver.

In certain aspects, the method further includes customizable settings by the digital fantasy sports memorabilia signor.

In certain aspects, the method further includes (h) after delivering the generated digital fantasy sports memorabilia to the digital fantasy sports memorabilia receiver, sharing the generated digital fantasy sports memorabilia with other participants in a fantasy sports league. In addition to or in the alternative, the method may also further include (h) after delivering the generated digital fantasy sports memorabilia to the digital fantasy sports memorabilia receiver, sharing the generated digital fantasy sports memorabilia with participants in another fantasy sports league. In addition to or in the alternative, the method may also further include (h) after delivering the generated digital fantasy sports memorabilia to the digital fantasy sports memorabilia receiver, trading the generated digital fantasy sports memorabilia with others in a same or different fantasy sports league for incentives, the incentives selected from the group consisting of other digital fantasy sports memorabilia, league points, players from other's teams, or any combination thereof.

Also disclosed is a system for generating digital fantasy sports memorabilia, the system including: a memory for storing executable instructions; a processor for executing the executable instructions, the executable instructions comprising: a content module that: provides a digital fantasy sports memorabilia to a digital photograph (e.g., of the signor's actual team), a digital fantasy sports signor, the digital fantasy sports memorabilia selected from the group consisting of a digital photograph of the signor in the signor's actual team's jersey, digital fantasy sports photograph, a digital fantasy sports jersey, or a combination thereof receives at least one of an electronic signature or an electronic written message from the digital fantasy sports memorabilia signor, and optionally configured to receive a voice message, video message, or a combination thereof from the digital fantasy sports memorabilia signor; an embedding module that embeds at least one of an electronic signature or an electronic written message from the digital fantasy sports memorabilia signor into the digital fantasy sports memorabilia to generate generated digital fantasy sports memorabilia; a storage module that stores the generated digital fantasy sports memorabilia; and a delivery module that delivers the generated digital fantasy sports memorabilia to a digital fantasy sports memorabilia receiver, wherein: the content module sends the electronic signature or electronic written message to a verification service that verifies authenticity of the electronic written message or electronic signature of the generated digital memorabilia by generating a scoring number associated with digital fantasy sports memorabilia signor identification verification in which the electronic signature or the electronic written message must achieve at least a 90% confidence level based on an X,Y array coordinates including a statistical comparison of velocity between coordinates and relative position of points between coordinates and the voice message, video message, or a combination thereof, if present, must achieve at least a 90% confidence level based on amplitude and frequency and/or facial recognition when compared to reference samples. In certain aspects, any combination of the above mentioned modules may concurrently or sequentially perform the disclosed tasks in real time.

In certain aspects, the system is configured such that the delivery module delivers generated digital fantasy sports memorabilia to the digital fantasy sports memorabilia receiver based on the scoring number.

In certain aspects, the system further includes executable instructions for a monitoring agent that monitors at least one of an electronic signature, a voice message, or an electronic written message.

In certain aspects, the content module of the system sends the electronic signature and electronic written message to a verification service that verifies authenticity of the electronic written message and electronic signature of the generated digital memorabilia by generating a scoring number associated with digital fantasy sports memorabilia signor identification verification in which the electronic signature or the electronic written message must achieve at least a 99% confidence level based on an X,Y array coordinates including a statistical comparison of velocity between coordinates and relative position of points between coordinates and the voice message, video message, or a combination thereof, if present, must achieve at least a 99% confidence level based on amplitude and frequency and/or facial recognition when compared to reference samples.

In certain aspects, the content module further includes executable instructions to generate a certificate of authenticity for the generated digital fantasy sports memorabilia.

In certain aspects, the content module is configured to deliver the certificate of authenticity concurrently with the generated digital fantasy sports memorabilia to the digital fantasy sports receiver.

In certain aspects, the content module is configured to deliver the certificate of authenticity after delivery of the generated digital fantasy sports memorabilia to the digital fantasy sports receiver.

Also disclosed herein is non-transitory computer readable medium embodying a program executable in a computing device for generating digital fantasy sports memorabilia, the program including (a) a program code for providing a digital fantasy sports memorabilia signor with a digital photograph (e.g., of the signor's actual team), a digital fantasy sports photograph, a digital fantasy sports jersey, or a combination thereof; (b) a program code for receiving an electronic signature, an electronic written message, or a combination thereof from the fantasy sports digital memorabilia signor to be embedded in the digital photograph (e.g., of the signor's actual team), the digital fantasy sports photograph, the digital fantasy sports jersey, or a combination thereof; (c) a program code optionally receiving a voice message, video message, or a combination thereof from the digital fantasy sports memorabilia signor to also be embedded in the digital photograph (e.g., of the signor's actual team), the digital fantasy sports photograph, the digital fantasy sports jersey, or the combination thereof; (d) a program code for embedding the electronic signature, the electronic written message, or a combination thereof from the digital fantasy sports memorabilia signor into the digital photograph (e.g., of the signor's actual team), the digital fantasy sports photograph, the digital fantasy sports jersey, or a combination thereof to form the generated digital fantasy sports memorabilia; wherein the generated digital fantasy sports memorabilia optionally includes the voice message, video message, or a combination thereof in the digital fantasy sports photograph; (e) a program code for sending the generated digital fantasy sports memorabilia including the electronic signature, the electronic written message, or a combination thereof to a verification service to verify authenticity of the electronic signature and electronic written message in the generated digital fantasy sports memorabilia; and (f) a program code for delivering the generated digital fantasy sports memorabilia to a digital fantasy sports memorabilia receiver in real time or upon request. In certain aspects, any combination of the program code mentioned immediately is performed either simultaneously or concurrently in real-time.

The above mentioned methods and systems allow for the generation of digital memorabilia (e.g., unique, personalized digital memorabilia) by a celebrity or athlete, and more particularly allows for the generation of digital fantasy sports memorabilia by an athlete. These methods and systems allow for monetizing a previously untapped revenue stream while further providing a service for fans that is not currently being met. By authenticating the above digital fantasy sports memorabilia, the ever-present danger of fraud can be avoided or highly reduced thereby providing encouragement and assurance of the authenticity of this digital fantasy sports memorabilia.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1:
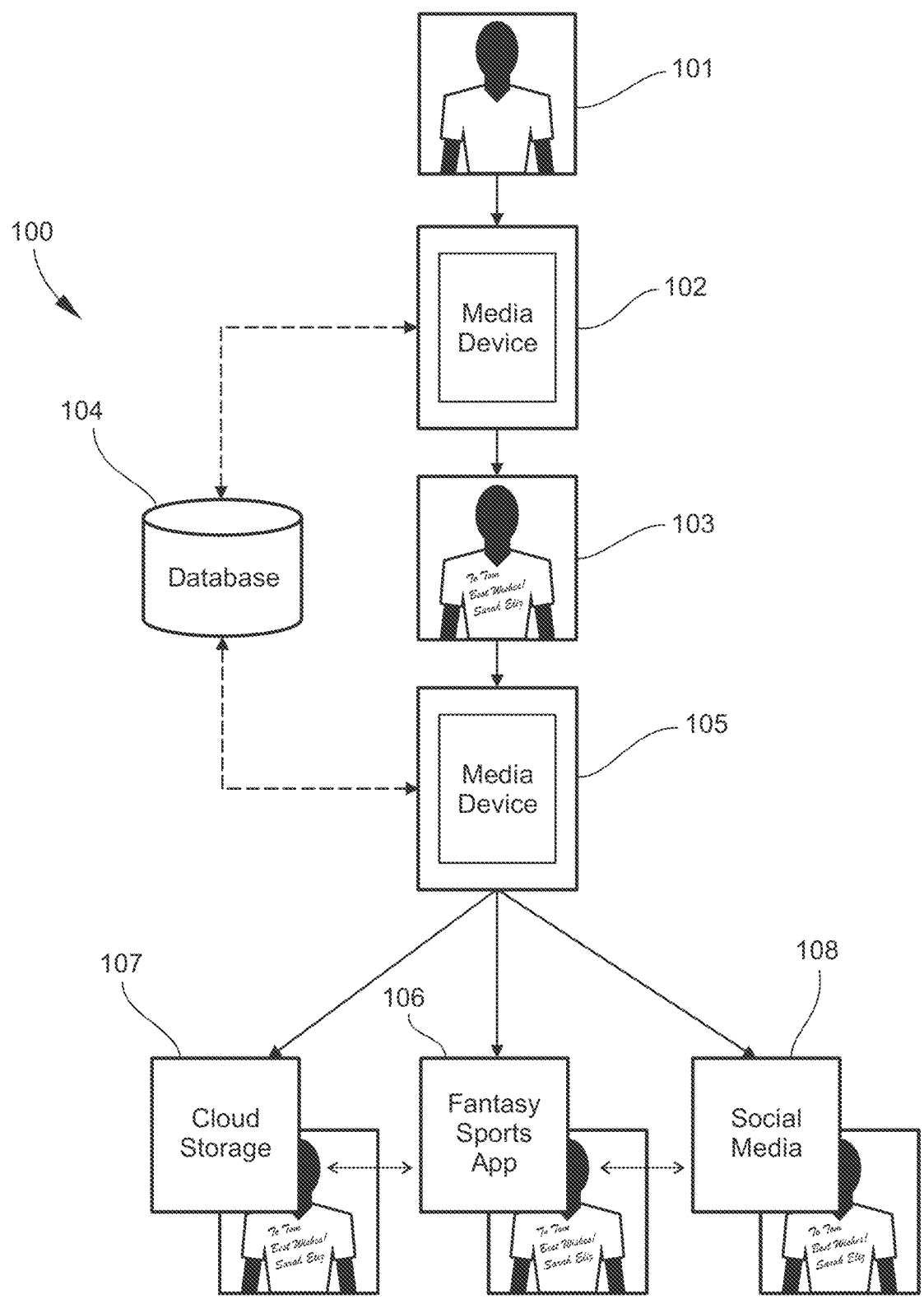
FIG. 1 depicts personalizing digital memorabilia and sharing and/or storing the personalized digital memorabilia according to the invention.

The present invention will now be described more fully hereinafter with reference to the accompanying drawings in which exemplary embodiments of the invention are shown. In particular, the present invention is described below with reference to block diagrams and operational illustrations of methods, systems, and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently. The invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Generally, in terms of hardware architecture for the electronic devices disclosed below, computing device includes a processor, a memory, and one or more input and/or output (I/O) devices (or peripherals) that are communicatively coupled via a local interface. Local interface may be one or more buses or other wired or wireless connections, as is known in the art. Local interface may have additional elements, which are omitted for simplicity, such as controllers, buffers (caches), drivers, transmitters, and receivers to facilitate external communications with other like or dissimilar computing devices. Further, local interface may include address, control, and/or data connections to enable internal communications among the other computer components.

The processor is a hardware device for executing software, particularly software stored in memory. The processor can be any custom made or commercially available processor, such as, for example, a Core series or vPro processor made by Intel Corporation, or a Phenom, Athlon or Sempron processor made by Advanced Micro Devices, Inc. In the case where computing device is a server, the processor may be, for example, a Xeon or Itanium processor from Intel, or an Opteron-series processor from Advanced Micro Devices, Inc. Processor may also represent multiple parallel or distributed processors working in unison. Processor may also represent multiple processors located in a plurality of computing devices working in parallel, unison, or serial effort to achieve the disclosed methods.

Memory can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic magnetic, optical, and/or other types of storage media. Memory can have a distributed architecture where various components are situated remote from one another, but are still accessed by processor. These other components may reside on devices located elsewhere on a network or in a cloud arrangement.

The software in memory may include one or more separate programs. The separate programs comprise ordered listings of executable instructions for implementing logical functions. The software in memory may include the system in accordance with the invention, and a suitable operating system (O/S). Examples of suitable commercially available operating systems are Windows operating systems available from Microsoft Corporation, Mac OS X available from Apple Computer, Inc., a Unix operating system from AT&T, or a Unix-derivative such as BSD or Linux. The operating system O/S will depend on the type of computing device. For example, if the computing device is a PDA or handheld computer (e.g., smartphone), the operating system may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system essentially controls the execution of other computer programs, such as the system, and provides scheduling, input-output control, file and data management, memory management, and communication control and related services.

If computing device is a PC compatible computer, Apple® computer, a handheld device, or the like, the software in memory may further include a basic input output system (BIOS). The BIOS is a set of essential software routines that initialize and test hardware at startup, start operating system, and support the transfer of data among the hardware devices. The BIOS is stored in ROM so that the BIOS can be executed when computing device is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C #, Pascal, Basic, Fortran, Cobol, Perl, Java, Ada, Python, Swift, and Lua.

I/O device may include input devices such as a keyboard, a mouse, a scanner, a microphone, a touch screen, a bar code reader, or an infra-red reader. It may also include output devices such as a printer, a video display, an audio speaker or headphone port or a projector. I/O device may also comprise devices that communicate with inputs or outputs, such as a short-range transceiver (RFID, Bluetooth, etc.), a telephonic interface, a cellular communication port, a router, or other types of network communication equipment. I/O device may be internal to computing device, or may be external and connected wirelessly or via connection cable, such as through a universal serial bus port.

When the computing device is in operation, processor is configured to execute software stored within memory, to communicate data to and from memory, and to generally control operations of computing device pursuant to the software. The system and operating system, in whole or in part, may be read by processor, buffered within processor, and then executed.

In the context of this document, a "computer-readable medium" may be any means that can store, communicate, propagate, or transport data objects for use by or in connection with the system. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would in46clude the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system can be embodied in any type of computer-readable medium for use by or in connection with an instruction execution system or apparatus, such as a computer.

For purposes of connecting to other computing devices, computing device is equipped with network communication equipment and circuitry. In a preferred embodiment, the network communication equipment includes a network card such as an Ethernet card, or a wireless connection card. In a preferred network environment, each of the plurality of computing devices on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks. In certain aspects, standalone systems not requiring connectivity to other systems are also contemplated.

FIGS. 1-5 depict exemplary systems and methods for generating digital fantasy sports memorabilia. FIG. 1 is a block diagram of an exemplary environment 100 for implementing the methods and systems for generating digital fantasy sports memorabilia. In this environment 100, using the disclosed methods and systems a digital memorabilia signor including a celebrity, and more preferably an athlete, receives digital memorabilia (e.g., unpersonalized digital memorabilia) 101 on their media device 102. The memorabilia may include, but is not limited to, a digital photograph (e.g., a photograph of the signor in the signor's actual team jersey), a digital fantasy sports photograph, a digital jersey, a digital fantasy sports jersey, digital logo, or any combination thereof, and the media device 102 may include, but is not limited to, to a smartphone, a laptop, and a personal digital assistant. After receiving the digital memorabilia 101, the digital memorabilia 101 is subsequently personalized by, for example, the athlete on the digital media device 102. The athlete's digital media device 102 may further include a stylus for autographing the memorabilia, for writing a personal message in the memorabilia, or a combination thereof (i.e., personalizing the memorabilia), and the athlete's digital media device may further include audio and/or video capabilities for recording a personalized voice and/or video message that may also be embedded in the digital memorabilia 101 to subsequently for the generated digital fantasy sports memorabilia 103. In certain aspects, digital media device 102 may be linked to a separate database 104 for archiving, retrieving, and personalizing the digital memorabilia 101, and/or the personal media device 102 may be configured to directly personalize the digital memorabilia 101 in real time, independently of database 104, to generate the generated digital fantasy sports memorabilia 103. In particular, an electronic signature, an electronic written message, or a combination thereof from the athlete may be embedded into the digital memorabilia and may further optional include a voice message, a video message, or a combination thereof from the athlete embedded into the digital memorabilia to generate the generated digital fantasy sports memorabilia 103.

In certain aspects and while or after generating the generated digital fantasy sports memorabilia 103, it is imperative to verify and validate the digital memorabilia signor's authenticity. This may be accomplished by sending the generated digital fantasy sports memorabilia 103 including the electronic signature, the electronic written message, or a combination thereof to a verification service to verify authenticity of the electronic signature and electronic written message in the generated digital fantasy sports memorabilia. In certain aspects, validation is conducted by verifying authenticity of the electronic signature or electronic written message of the generated digital fantasy sports memorabilia by generating a scoring number associated with digital fantasy sports memorabilia signor identification verification in which the electronic signature and the electronic written message must achieve at least a 90% confidence level based on an X,Y array coordinates including a statistical comparison of velocity between coordinates and relative position of points between coordinates and the voice message, video message, or combination thereof, if present, must achieve at least a 90% confidence level based on amplitude and frequency and/or facial recognition when compared to reference samples of the digital fantasy sports memorabilia signor. Facial recognition can be calculated using a two dimensional mapping matrix comparing X,Y array coordinates of the digital memorabilia signor and comparing these values to a control, reference sample. In other aspects, the electronic signature or the electronic written message must achieve at least a 95% confidence level based on an X,Y array coordinates including a statistical comparison of velocity between coordinates and relative position of points between coordinates and the voice message, video message, or combination thereof, if present, must achieve at least a 95% confidence level based on amplitude and frequency and/or facial recognition when compared to reference samples of the digital fantasy sports memorabilia signor. In additional aspects, the electronic signature and the electronic written message must achieve at least a 99% confidence level based on an X,Y array coordinates including a statistical comparison of velocity between coordinates and relative position of points between coordinates and wherein at least one of the voice message, the video message, or a combination thereof is present in the generated digital fantasy sports memorabilia and must achieve at least a 99% confidence level based on amplitude and frequency and/or facial recognition when compared to reference samples of the digital fantasy sports memorabilia signor.

After verifying authenticity of the electronic signature, the written message, or a combination thereof in the generated digital fantasy sports memorabilia 103, the generated digital fantasy sports memorabilia is delivered to a digital fantasy sports memorabilia receiver's device 105 (e.g., a fantasy sports participant's phone, computer, laptop, etc.), which may include directly delivering this generated digital fantasy sports memorabilia to an application 106 on the digital fantasy sports receiver's device 105. In certain aspects, the generated digital fantasy sports memorabilia 103 may be shared via social media 108 from the device 105, and/or the generated digital fantasy sports memorabilia 103 may be stored 107, for example, via cloud computing for later use. In certain alternative aspects, the generated digital fantasy sports memorabilia may be delivered to the receiver before verification/authentication. Subsequent authentication/verification may take place, and then the authenticated generated digital memorabilia may be delivered to the receiver.

Figure 2:
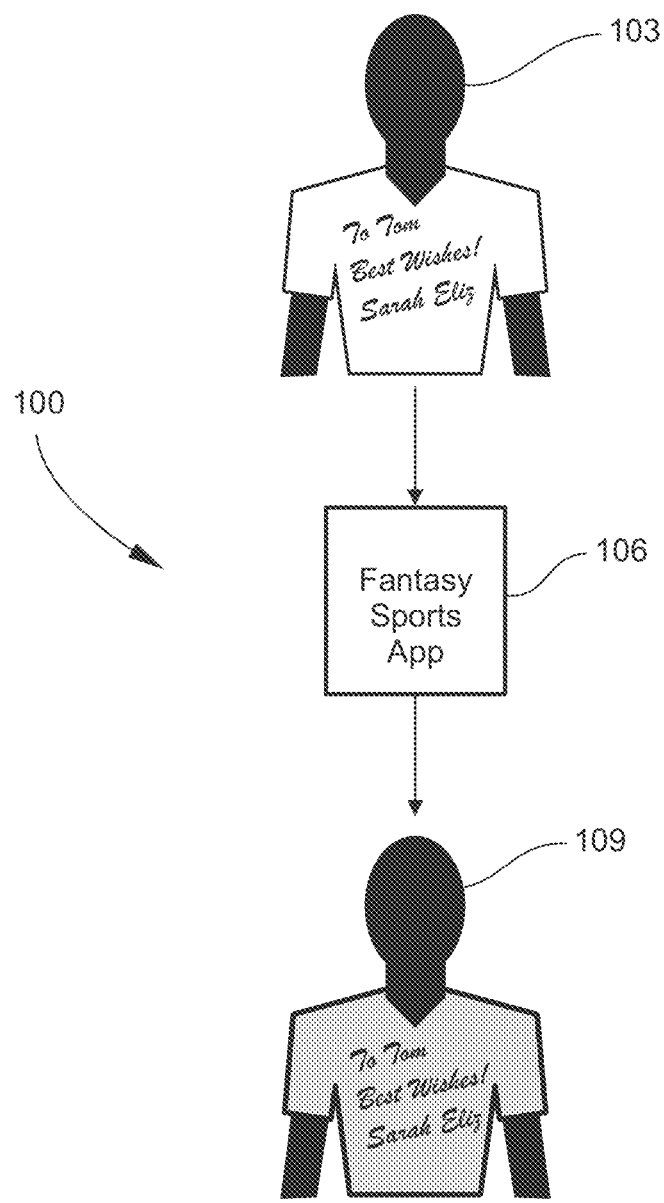
FIG. 2 depicts sharing personalized digital memorabilia between two individuals participating in the disclosed systems and methods.

Referring to FIG. 2, the digital memorabilia signor, for example an athlete, personalizes digital memorabilia 101 as described above to form the generated digital fantasy sports memorabilia 103. As alluded to above, personalization can include incorporating an autograph, a personalized written message, a video, a personalized video, or any combination thereof, but in general, the generated digital fantasy sports memorabilia 103 is addressed specifically to the digital memorabilia receiver (i.e., one or a plurality of fantasy sports fan(s)) typically by name. After authentication, the generated digital fantasy sports memorabilia 103 may be delivered to a fantasy sports application 106 on the receiver's device 105 where the generated digital fantasy sports memorabilia 103 may be subsequently further customized using customizable options included in fantasy sports application 106. For example, this generated digital fantasy sports memorabilia 103 may be further customized by incorporating a fantasy sport's teams logo, emblem, colors, changing colors, or any combination thereof 109.

Figure 3:
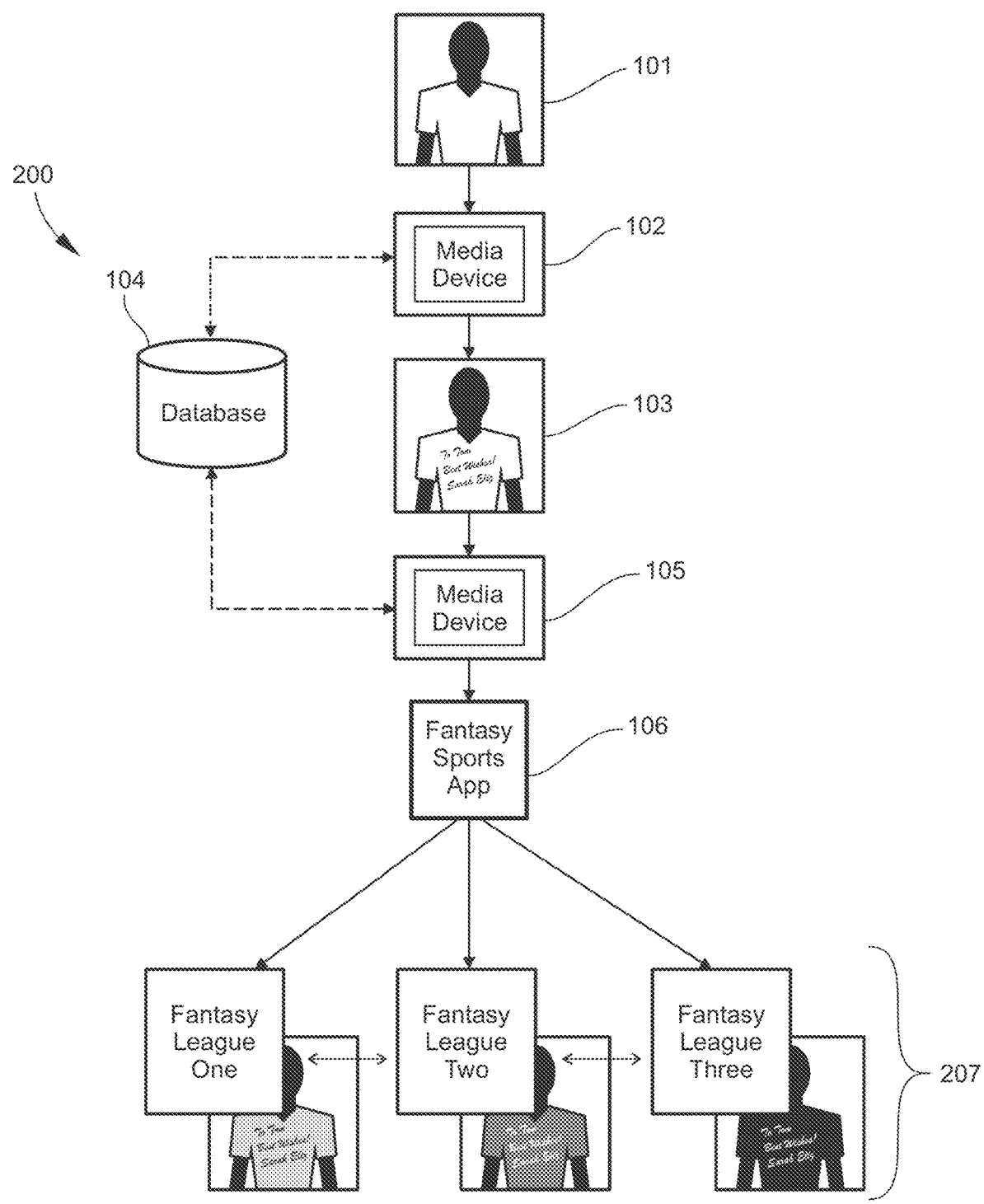
FIG. 3 depicts personalizing digital memorabilia and sharing this personalized digital memorabilia in a plurality of fantasy sports leagues.

Referring to FIG. 3, the digital memorabilia signor, for example an athlete, personalizes digital memorabilia 101 for the digital memorabilia receiver to form generated digital fantasy sports memorabilia 103, and then this generated digital fantasy sports memorabilia may be shared between multiple fantasy sports leagues (collectively 207), which the digital memorabilia receiver participates in. In the alternative, the generated digital fantasy sports memorabilia 103 may be shared or traded in the same fantasy sports league. For example, as shown in FIG. 2, the generated digital fantasy sports memorabilia 103 may be received by media device 105 and/or communicated to the application 106 on media device 105. This generated digital fantasy sports memorabilia 103 may be further customized in application 106 by incorporating a fantasy sports team's logo, emblem, colors, or any combination thereof 109, and this customized memorabilia 109 may be used in one or a plurality of digital activities including, but not limited to, use in multiple fantasy sports leagues 207. In certain aspects, the same athlete's image and personalization may incorporate each virtual team's uniform, logo, emblems, or any combination thereof 207 for each of the digital memorabilia receiver's (i.e., fantasy sport's fan) virtual teams.

Figure 4:
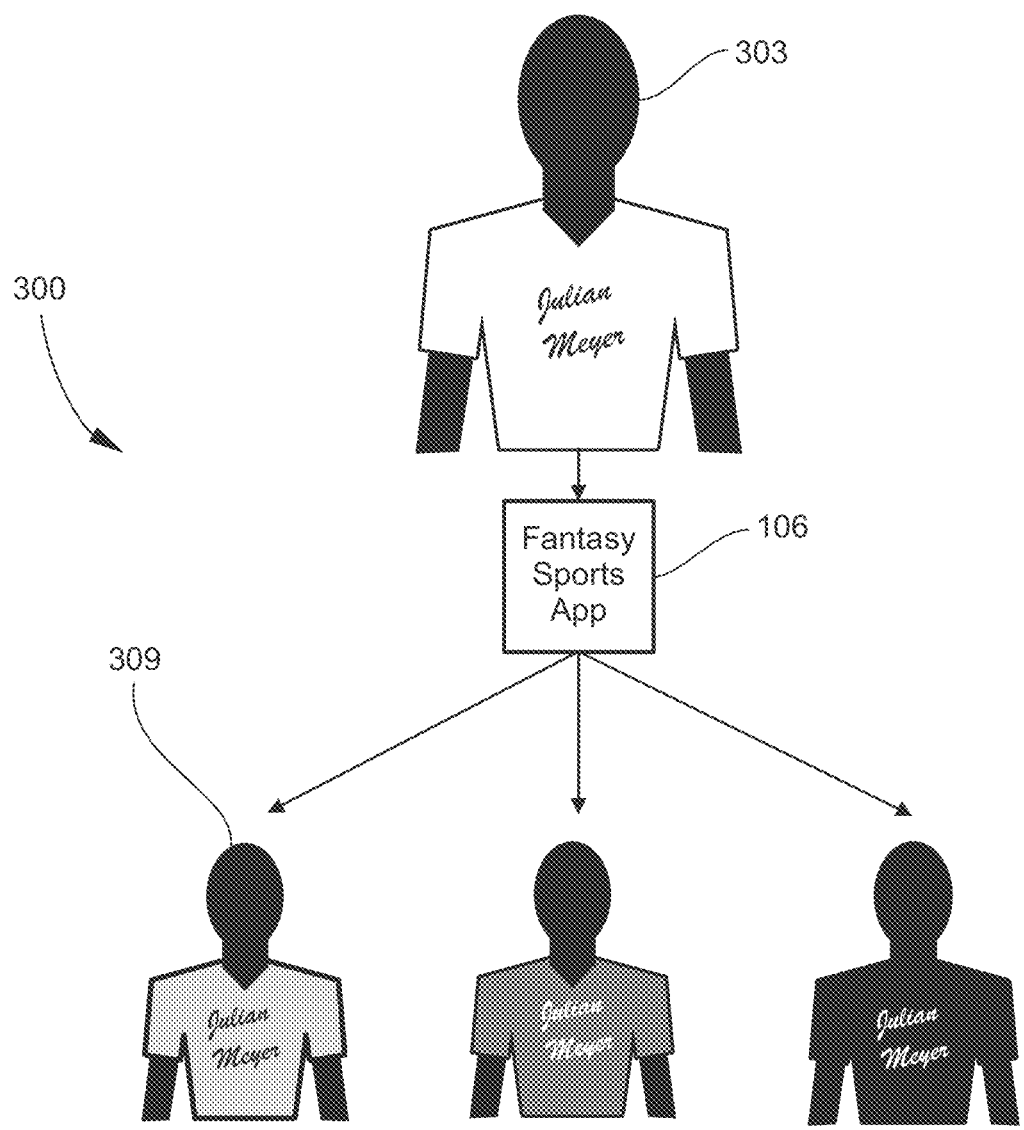
FIG. 4 depicts digitally autographed memorabilia without personalization for use in a fantasy sports league.
Figure 5:
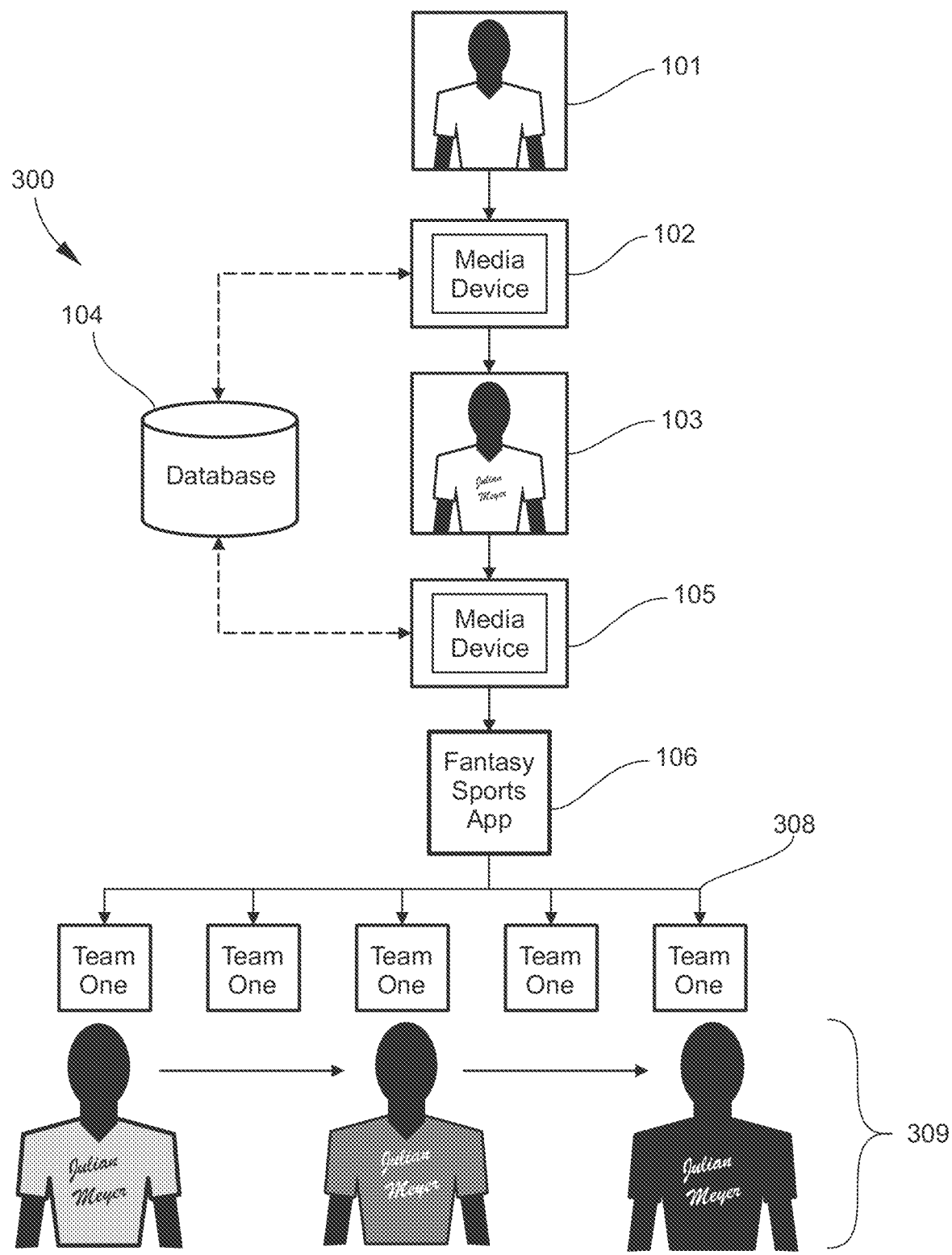
FIG. 5 depicts trading digitally autographed memorabilia between teams within a fantasy sports league.

FIGS. 4 and 5 depict another embodiment 300 of the invention in which the digital memorabilia 101 may be autographed by the digital memorabilia signor using media device 102, but the digital memorabilia 101 is not personalized. In this embodiment, the digital memorabilia may be merely autographed, include a generic non-personalized message, or a combination thereof by the digital memorabilia signor to form the generated digital memorabilia 303. Because the generated digital fantasy sports memorabilia 303 is not personalized, e.g., written and/or addressed directly to someone and/or includes video addressed directly to someone, it can be shared with anyone participating in fantasy sports platforms/leagues. For example, generated digital fantasy sports memorabilia 303 can be traded with other players in the same fantasy league 308, or alternatively, generated digital fantasy sports memorabilia 303 may be traded between leagues to a person desiring this memorabilia. When traded to someone either in the same or a different league, this memorabilia may be further customized by the acquirer by altering team logo, color, uniform, or any combination thereof. In certain aspects, limitations to sharing and trading exist. For example, generated digital fantasy sports memorabilia 303 may be shared with only one user at a time, one league at a time, or a combination thereof, as there will be only one iteration of the generated digital fantasy sports memorabilia 303. This feature prevents duplication and subsequent devaluation of the generated digital fantasy sports memorabilia.

Referring specifically to FIG. 5, an athlete may digitally autograph a digital jersey, a digital trading card, a digital photograph (e.g., a digital fantasy sports jersey, a digital fantasy sports trading card, etc.), or any combination thereof resulting in generated digital fantasy sports memorabilia 303 that is first authenticated as disclosed above, then communicated to media device 105. Then the generated digital memorabilia 303 can subsequently be traded between teams 309 in the same fantasy league, or alternatively, this generated digital fantasy sports memorabilia 303 can be traded between different fantasy leagues, as shown for example by 207 in FIG. 3. As alluded to above, trading and/or sharing this generated digital fantasy sports memorabilia 303 is preferably limited to only one occurrence to prevent duplication and subsequent devaluation of this generated digital fantasy sports memorabilia and to further maintain the athlete's right of publicity. In certain aspects, the generated digital fantasy sports memorabilia may be finalized and unalterable when trading and/or sharing this digital fantasy sports memorabilia between fantasy sports leagues. However, when trading and/or sharing this memorabilia between teams in the same league, this memorabilia may be altered by adopting any virtual team's logo, color, specialty uniform, or any combination thereof (collectively 309).

With any of the generated digital memorabilia 103, 303, this memorabilia can also be used in a rewards or incentive program the athlete, team, or league may choose to create, subject to appropriate laws, rules, and regulations. These rewards and/or incentives may include, but are not limited to, receipt of other digital fantasy sports memorabilia, team points, players from other's rosters, or any combination thereof.

In one embodiment of the invention an athlete signs a real world digital trading card with the athlete's image on it. This personalization is then added to the fan's virtual team card of the same player.

In another embodiment, the athlete autographs his digital trading card for a fan, and the personalized image is shared across multiple fantasy sports leagues the fan participates in.

In another embodiment, a video clip (a specific play or series perhaps) is autographed by the player in digital media. The autographed video clip is then shared with the fan's fantasy sports league as well.

In one embodiment, athletes use autographed or personalized digital memorabilia is used in a fantasy sports league as part of a rewards and incentive program, a gift program, or a combination thereof.

In another embodiment, the generated digital fantasy sports memorabilia 103, 303 is time coded so that it expires and/or disappears at a preset time, for instance at the end of the real-sport season or monthly or weekly or even on a daily basis.

In another embodiment, the preset expiration of autographed or personalized digital memorabilia can be delivered and displayed through popular messaging applications (Snapchat, Message Me, Kik, etc.).

Also disclosed is a system for generating digital fantasy sports memorabilia, the system including: a memory for storing executable instructions; a processor for executing the executable instructions, the executable instructions comprising: a content module that: provides a digital fantasy sports memorabilia to a digital fantasy sports signor, the digital fantasy sports memorabilia selected from the group consisting of a digital fantasy sports photograph, a digital fantasy sports jersey, or a combination thereof; receives at least one of an electronic signature or an electronic written message from the digital fantasy sports memorabilia signor, and optionally configured to receive a voice message from the digital fantasy sports memorabilia signor; an embedding module that embeds at least one of an electronic signature or an electronic written message from the digital fantasy sports memorabilia signor into the digital fantasy sports memorabilia to generate generated digital fantasy sports memorabilia; a storage module that stores the generated digital fantasy sports memorabilia; and a delivery module that delivers the generated digital fantasy sports memorabilia to a digital fantasy sports memorabilia receiver, wherein: the content module sends the electronic signature or electronic written message to a verification service that verifies authenticity of the electronic written message or electronic signature of the generated digital memorabilia by generating a scoring number associated with digital fantasy sports memorabilia signor identification verification in which the electronic signature or the electronic written message must achieve at least a 90% confidence level based on an X,Y array coordinates including a statistical comparison of velocity between coordinates and relative position of points between coordinates and the voice message must achieve at least a 90% confidence level based on amplitude and frequency when compared to reference samples.

In yet another aspect, disclosed is a non-transitory computer readable medium embodying a program executable in a computing device for generating digital fantasy sports memorabilia, the program including: (a) a program code for providing a digital fantasy sports memorabilia signor with a digital photograph (e.g., a photograph of the signor in the signor's actual team jersey), digital fantasy sports photograph, a digital fantasy sports jersey, or a combination thereof; (b) a program code for receiving an electronic signature, an electronic written message, or a combination thereof from the fantasy sports digital memorabilia signor to be embedded in the digital fantasy sports photograph, the digital fantasy sports jersey, or a combination thereof; (c) a program code optionally receiving a voice message from the digital fantasy sports memorabilia signor to also be embedded in the digital fantasy sports photograph, the digital fantasy sports jersey, or the combination thereof; (d) a program code for embedding the electronic signature, the electronic written message, or a combination thereof from the digital fantasy sports memorabilia signor into the digital fantasy sports photograph, the digital fantasy sports jersey, or a combination thereof to form the generated digital fantasy sports memorabilia; wherein the generated digital fantasy sports memorabilia optionally includes the voice message in the digital fantasy sports photograph; (e) a program code for sending the generated digital fantasy sports memorabilia including the electronic signature, the electronic written message, or a combination thereof to a verification service to verify authenticity of the electronic signature and electronic written message in the generated digital fantasy sports memorabilia; and (f) a program code for delivering the generated digital fantasy sports memorabilia to a digital fantasy sports memorabilia receiver in real time or upon request.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A method for generating digital memorabilia, the method comprising:
   (a) providing a digital memorabilia signor with a digital photograph, a digital sports jersey, or a combination thereof;
   (b) receiving an electronic signature, an electronic written message, or a combination thereof from the digital memorabilia signor to be embedded in the photograph, the digital sports jersey, or a combination thereof;
   (c) optionally receiving a voice message, video message, or a combination thereof from the digital memorabilia signor to also be embedded in the digital photograph, the digital sports jersey, or the combination thereof;
   (d) embedding the electronic signature, the electronic written message, or a combination thereof from the digital memorabilia signor into the digital photograph, the digital sports jersey, or a combination thereof to form generated digital memorabilia; wherein the generated digital memorabilia optionally includes the voice message, video message, or a combination thereof in the digital photograph;
   (e) after generating the generated digital memorabilia, optionally sending the generated digital memorabilia including the electronic signature, the electronic written message, or a combination thereof to a verification service to verify authenticity of the electronic signature and electronic written message in the generated digital memorabilia; and
   (f) delivering the generated digital memorabilia to a digital memorabilia receiver in real time, of
   (g) storing the generated digital memorabilia for delivery to the digital receiver upon request, wherein verification comprises verifying authenticity of the electronic signature or electronic written message of the generated digital memorabilia by generating a scoring number associated with digital memorabilia signor identification verification in which the electronic signature and the electronic written message must achieve at least a 90% confidence level based on an X,Y array coordinates including a statistical comparison of velocity between coordinates and relative position of points between coordinates and the voice message, video message, or combination thereof, if present, must achieve at least a 90% confidence level based on amplitude and frequency of facial recognition when compared to reference samples of the digital memorabilia signor.

2. The method of claim 1, wherein the electronic signature or the electronic written message must achieve at least a 95% confidence level based on an X,Y array coordinates including a statistical comparison of velocity between coordinates and relative position of points between coordinates and the voice message, video message, or combination thereof, if present, must achieve at least a 95% confidence level based on amplitude and frequency or facial recognition when compared to reference samples of the digital memorabilia signor.

3. The method of claim 1, wherein the electronic signature and the electronic written message must achieve at least a 99% confidence level based on an X,Y array coordinates including a statistical comparison of velocity between coordinates and relative position of points between coordinates and wherein at least one of the voice message or video message is present in the generated digital memorabilia and must achieve at least a 99% confidence level based on amplitude and frequency of facial recognition when compared to reference samples of the digital memorabilia signor.

4. The method of claim 1, wherein the generated digital fantasy memorabilia includes the voice message, and the voice message must achieve at least a 95% confidence level based on amplitude and frequency when compared to reference samples of the digital memorabilia signor.

5. The method of claim 1, further comprising monitoring at least one of an electronic signature, a voice message, or an electronic written message by a monitoring agent.

6. The method of claim 5, further comprising determining whether the generated digital memorabilia with the voice message and the electronic signature or electronic written message is delivered to the digital memorabilia receiver based at least in part on the monitoring agent.

7. The method of claim 2, further comprising generating a certificate of authenticity for the generated digital memorabilia including the percentage of confidence of authenticity.

8. The method of claim 7, further comprising customizable settings by the digital memorabilia signor.

9. The method of claim 1, further comprising
(h) after delivering the generated digital memorabilia to the digital memorabilia receiver, sharing the generated digital memorabilia with other participants in a league.

10. The method of claim 1, further comprising,
(h) after delivering the generated digital memorabilia to the digital memorabilia receiver, sharing the generated digital memorabilia with participants in another league.

11. A system for generating digital memorabilia, the system comprising:
a memory for storing executable instructions;
a processor for executing the executable instructions, the executable instructions comprising:
a content module that:
provides a digital memorabilia to a digital memorabilia signor, the digital memorabilia comprising a digital photograph, a digital sports jersey, or a combination thereof;
receives at least one of an electronic signature or an electronic written message from the digital memorabilia signor, and optionally configured to receive a voice message, video message, or a combination thereof from the digital memorabilia signor;
an embedding module that embeds at least one of an electronic signature or an electronic written message from the digital memorabilia signor into the digital memorabilia to generate generated digital memorabilia;
a storage module that stores the generated digital memorabilia; and
a delivery module that delivers the generated digital memorabilia to a digital memorabilia receiver, wherein:
the content module sends the electronic signature or electronic written message to a verification service that verifies authenticity of the electronic written message or electronic signature of the generated digital memorabilia by generating a scoring number associated with digital memorabilia signor identification verification in which the electronic signature or the electronic written message must achieve at least a 90% confidence level based on an X,Y array coordinates including a statistical comparison of velocity between coordinates and relative position of points between coordinates, and if present, the voice message, video message, or a combination thereof must achieve at least a 90% confidence level based on amplitude and frequency or facial recognition when compared to reference samples.

12. The system of claim 11, in which the delivery module delivers generated digital memorabilia to the digital memorabilia receiver based on the scoring number.

13. The system of claim 11, the processor further comprising executable instructions for a monitoring agent that monitors at least one of an electronic signature, a voice message, or an electronic written message.

14. The system of claim 11, wherein content module sends the electronic signature and electronic written message to a verification service that verifies authenticity of the electronic written message and electronic signature of the generated digital memorabilia by generating a scoring number associated with digital memorabilia signor identification verification in which the electronic signature or the electronic written message must achieve at least a 99% confidence level based on an X,Y array coordinates including a statistical comparison of velocity between coordinates and relative position of points between coordinates and the voice message, video message, or a combination thereof must achieve at least a 99% confidence level based on amplitude and frequency or facial recognition when compared to reference samples.

15. The system of claim 11, the content module further comprising executable instructions to generate a certificate of authenticity for the generated digital memorabilia.

16. The system of claim 15, wherein the content module is configured to deliver the certificate of authenticity concurrently with the generated digital memorabilia to the digital receiver.

17. The system of claim 15, wherein the content module is configured to deliver the certificate of authenticity after delivery of the generated digital memorabilia to the digital receiver.

18. A non-transitory computer readable storage medium having embodied thereon a program, the program being executable by a processor to perform the method for generating digital memorabilia, the method comprising:
(a) providing a digital memorabilia signor with a digital photograph, a digital jersey, or a combination thereof;
(b) receiving an electronic signature, an electronic written message, or a combination thereof from the digital memorabilia signor to be embedded in the digital photograph, the digital jersey, or a combination thereof;
(c) optionally receiving a voice message from the digital memorabilia signor to also be embedded in the digital photograph, the digital jersey, or the combination thereof;
(d) embedding the electronic signature, the electronic written message, or a combination thereof from the digital memorabilia signor into the digital photograph, the digital jersey, or a combination thereof to form generated digital memorabilia; wherein the generated digital memorabilia optionally includes the voice message, video message, or a combination thereof in the digital photograph;

(e) sending the generated digital memorabilia including the electronic signature, the electronic written message, or a combination thereof to a verification service to verify authenticity of the electronic signature, the electronic written message, or a combination thereof in the generated digital memorabilia; and (f) delivering the generated digital memorabilia to a digital memorabilia receiver in real time or upon request.

\* \* \* \* \*